United States Patent
Ochi et al.

(10) Patent No.: US 8,344,652 B2
(45) Date of Patent: Jan. 1, 2013

(54) OPTICAL MEASURING APPARATUS

(75) Inventors: Kenji Ochi, Hiroshima (JP); Naoki Shirai, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 208 days.

(21) Appl. No.: 12/695,395

(22) Filed: Jan. 28, 2010

(65) Prior Publication Data

US 2010/0194283 A1 Aug. 5, 2010

(30) Foreign Application Priority Data

Jan. 29, 2009 (JP) ................................. 2009-018552

(51) Int. Cl.
*G05F 1/00* (2006.01)
*G01J 5/02* (2006.01)
(52) U.S. Cl. .................................. 315/291; 250/339.09
(58) Field of Classification Search .......... 315/291–293, 315/4, 307–308; 250/214 D, 339.9, 341.5, 250/341.7

See application file for complete search history.

(56) References Cited

U.S. PATENT DOCUMENTS

| | | | |
|---|---|---|---|
| 7,015,447 B2 * | 3/2006 | Yoshida et al. | 250/205 |
| 7,015,825 B2 * | 3/2006 | Callahan | 340/815.45 |
| 7,016,053 B2 * | 3/2006 | Moriuchi et al. | 356/601 |
| 7,026,769 B2 * | 4/2006 | Lee et al. | 315/291 |
| 7,358,929 B2 * | 4/2008 | Mueller et al. | 345/1.3 |
| 7,835,057 B2 * | 11/2010 | Kayser et al. | 359/246 |
| 8,013,281 B2 * | 9/2011 | Morgan et al. | 250/205 |
| 2005/0007604 A1 | 1/2005 | Yoshida et al. | |

* cited by examiner

*Primary Examiner* — Minh D A
(74) *Attorney, Agent, or Firm* — Rankin, Hill & Clark LLP

(57) ABSTRACT

An optical measuring apparatus including: a measuring apparatus body, a lighting unit, a lighting controller. The lighting unit is demountably mounted on the measuring apparatus and has an LED as a light source. The lighting controller is configured to control the lighting unit according to a light intensity command value. The lighting unit includes a storage unit in which a calibration value is stored. The calibration value generates a light intensity corresponding to the light intensity command value. The lighting controller is configured to read calibration values corresponding to the light intensity command value out from the storage unit of the lighting unit upon receipt of the light intensity command value, and controls the LED on the basis of the calibration value.

4 Claims, 7 Drawing Sheets

OPTICAL MEASURING APPARATUS

BACKGROUND OF THE INVENTION

1. Field of the Invention

The present invention generally relates to an optical measuring apparatus and, more specifically, to an optical measuring apparatus provided with a lighting unit having a light-emitting diode as a light source.

2. Description of the Related Art

An optical measuring apparatus provided with various lighting units (for example, an incident-light lighting unit or a transmission lighting unit) mounted on a measuring apparatus body and configured to measure the shape or the like of a measured object (work) while irradiating the measured object with light from any one of the lighting units is known.

For example, an image processing measuring apparatus described in Japanese Unexamined Patent Application Publication No. 2004-220834 includes an LED (Light Emitting Diode), a CCD (Charge Coupled Device) camera (image pickup device), and a control device configured to control the LED and the CCD camera. The control device illuminates the measured object while controlling an applied current to the LED according to an inputted light intensity command value, and acquires image information by controlling the CCD camera and receiving reflected light from the measured object. Then, the shape of the measured object is measured by processing the acquired image information.

In the optical measuring apparatus, differences in brightness affects measured results, and hence it is necessary to cause the lighting unit to generate an accurate light intensity corresponding to the given light intensity command (target) value. However, in an optical measuring apparatus having a lighting unit with an LED as a light source, the light intensity varies from LED to LED, even when the LEDs have the same model number. Therefore, a countermeasure for generating predetermined light intensities corresponding to the light intensity command values must be employed.

For example, as shown in FIG. 7, a conversion table (calibration value) including current command values and PWM (pulse width modulation) duty ratios required for causing an LED 44 of a lighting unit 4 to generate a light intensity corresponding to a light intensity command value (0 to 100%) given from the measuring apparatus body or a PC (Personal Computer) 3 is stored in a storage unit 48 of a lighting controller 6.

In addition to the storage unit 48, the lighting controller 6 is provided with a Digital to Analog (DA) converter 61, a Pulse Width Modulation (PWM) generator 62, a control unit 63 configured to read the current command value and the PWM duty ratio corresponding to the light intensity command value out from the storage unit 48 upon receipt of the light intensity command value and set the current command value and the PWM duty ratio to the DA converter 61 and the PWM generator 62, and a constant current generator 64.

Upon receipt of the light intensity command value, the control unit 63 reads calibration values (current command value and PWM duty ratio) corresponding to the light intensity command value out from the storage unit 48, and sets the current command value and the PWM duty ratio to the DA converter 61 and the PWM generator 62. A control pulse of the set PWM duty ratio is generated from the PWM generator 62. Then, when the control pulse generated from the PWM generator 62 is ON, the constant current generator 64 applies a current converted by the DA converter 61 corresponding to the current command value to the LED 44 of the lighting unit 4. Accordingly, the LED 44 emits light at the light intensity corresponding to the light intensity command value.

In the optical measuring apparatus in the related art, since the calibration values are stored in a lighting controller separate from the lighting unit, there are several problems.

Generally, the lifetime of the LED is longer than fluorescent lamps or the like, but the brightness is lower. Therefore, in applications which require accurate brightness, replacement of the LED at regular time intervals is desired. Accordingly, when replacing the lighting unit, it is necessary to write the calibration values to the lighting controller.

Writing the calibration values to the lighting controller is an important setting that affects the measurement accuracy, and must be performed with a high degree of reliability. Normally, a serviceman of the manufacturer needs to go to a user's site to perform the setting operation.

Further, registration of the calibration value at the time of assembly can be performed only after a combination of the lighting controller and the lighting unit is determined.

Therefore, the measuring apparatus in a latter half of assembly, and being almost completed, must wait for a time-consuming light calibration operation, resulting in disadvantages including an increase in the number of components in the midcourse of assembly and lowering of the manufacturing space efficiency.

A counter measure such that the time-consuming light calibration is performed in advance and the calibration data is stored in an FD (flexible disk) is also conceivable, but managing the FDs and the lighting units in pairs is troublesome.

When a wrong measuring unit is connected, that is, when a lighting unit other than the predetermined lighting unit is connected to the lighting controller, the apparatus may be used with an incorrect brightness.

SUMMARY OF THE INVENTION

In order to solve the problems described above, it is an object of the invention to provide an optical measuring apparatus that reduces a cost for the replacement of a lighting unit and improves production efficiency while eliminating the risk of using the apparatus with a wrong light intensity.

An optical measuring apparatus includes a measuring apparatus body, a lighting unit, and a lighting controller. The lighting unit is demountably mounted on the measuring apparatus and has a light-emitting diode as a light source. The lighting controller is configured to control the lighting unit according to a light intensity command value. The lighting unit includes a storage unit in which calibration values are stored. The calibration values cause the light-emitting diode to generate a light intensity corresponding to the light intensity command value. Upon receipt of a light intensity command value, the lighting controller reads out a calibration value corresponding to the light intensity command value from the calibration values stored in the storage unit, controls the light-emitting diode based upon the calibration value, and causes the light-emitting diode to generate the light intensity corresponding to the light intensity command value.

In this configuration, since the storage unit is provided on the lighting unit, which is demountably mounted on the measuring apparatus body, procedures to write the calibration values to the storage unit when replacing the lighting unit can be eliminated. Therefore, a serviceman does not have to go to a user's site to perform a setting operation, thereby reducing the cost for the replacement of the lighting unit.

Since the light calibration can be performed any time after the lighting unit is assembled, improvement of the production efficiency is achieved. In other words, disadvantages such as increase in number of components in the midcourse of assembly and lowering of the manufacturing space efficiency are avoided.

Simultaneously, the present invention eliminates the risk of connecting a wrong lighting unit and using the apparatus with a wrong light intensity.

Preferably, a conversion table including current command values to be applied to the light-emitting diode and duty ratios when controlling the pulse of a current to be applied to the light-emitting diode corresponding to light intensity command value is stored as the calibration values in the storage unit. Upon receipt of a light intensity command value, the lighting controller reads out a current command value and a duty ratio corresponding to the light intensity command value from the conversion table and applies a current corresponding to the current command value to the light-emitting diode in the lighting unit when a control pulse of the read out duty ratio is ON.

In this configuration, since the current command values to be applied to the light-emitting diode and the duty ratios when controlling the pulses of the currents to be applied to the light-emitting diode corresponding to the light intensity command values are stored as the calibration values, the light intensity of the light-emitting diode is accurately controlled using the two calibration values; the current command value and the duty ratio.

Preferably, different duty ratios are stored for low light intensity command values as the calibration values in the low light intensity command values and different current command values are stored as the calibration values in high light intensity command values from among the light intensity command values.

In general, in a range in which an applied current is low, the light intensity cannot be controlled smoothly by changing the applied current, so that the accurate light intensity cannot be obtained. However, in a range of an applied current of a certain reference value or higher, the light intensity can be controlled smoothly by changing the applied current, so that the accurate light intensity can be obtained.

According to the invention, since the different duty ratios are stored for the low light intensity command values (a range lower than a predetermined reference light intensity command value) as the calibration values in the low light intensity command values and different current command values are stored as the calibration values in the high light intensity command values (a range not lower than the predetermined reference light intensity command value) from among the light intensity command values, the light intensity of the light-emitting diode can be accurately controlled by controlling the pulse width in the low light intensity command values, and the light intensity of the light-emitting diode can be accurately controlled by controlling the current to be applied to the light-emitting diode in the high light intensity command values. Therefore, over the entire range of the light intensity command value, the light intensity of the light-emitting diode can be accurately controlled.

Preferably, the lighting unit includes a cable, a light-emitting unit provided at an end of the cable and having the light-emitting diode, and a connecting unit provided at the other end of the cable and being connected to the lighting controller. The storage unit is provided in the connecting unit.

In this configuration, since the lighting unit includes the cable, the light-emitting unit, and the connecting unit, and the connecting unit is provided with the storage unit, the storage unit is prevented from being affected by the heat from the light-emitting unit as much as possible.

Preferably, the light-emitting unit includes a heat-discharging fan, and the operation of the heat-discharging fan is controlled by the lighting controller when the connecting unit is connected to the lighting controller.

In this configuration, since the heat-discharging fan is provided in the light-emitting unit, and the operation of the heat-discharging fan is controlled by the lighting controller when the connecting unit is connected to the lighting controller, it is specifically suitable for the lighting unit with a high light intensity.

BRIEF DESCRIPTION OF THE DRAWINGS

These and further features of the invention will be apparent with reference to the following description and drawings, wherein.

DESCRIPTION OF THE PREFERRED EMBODIMENTS

Figure 1:
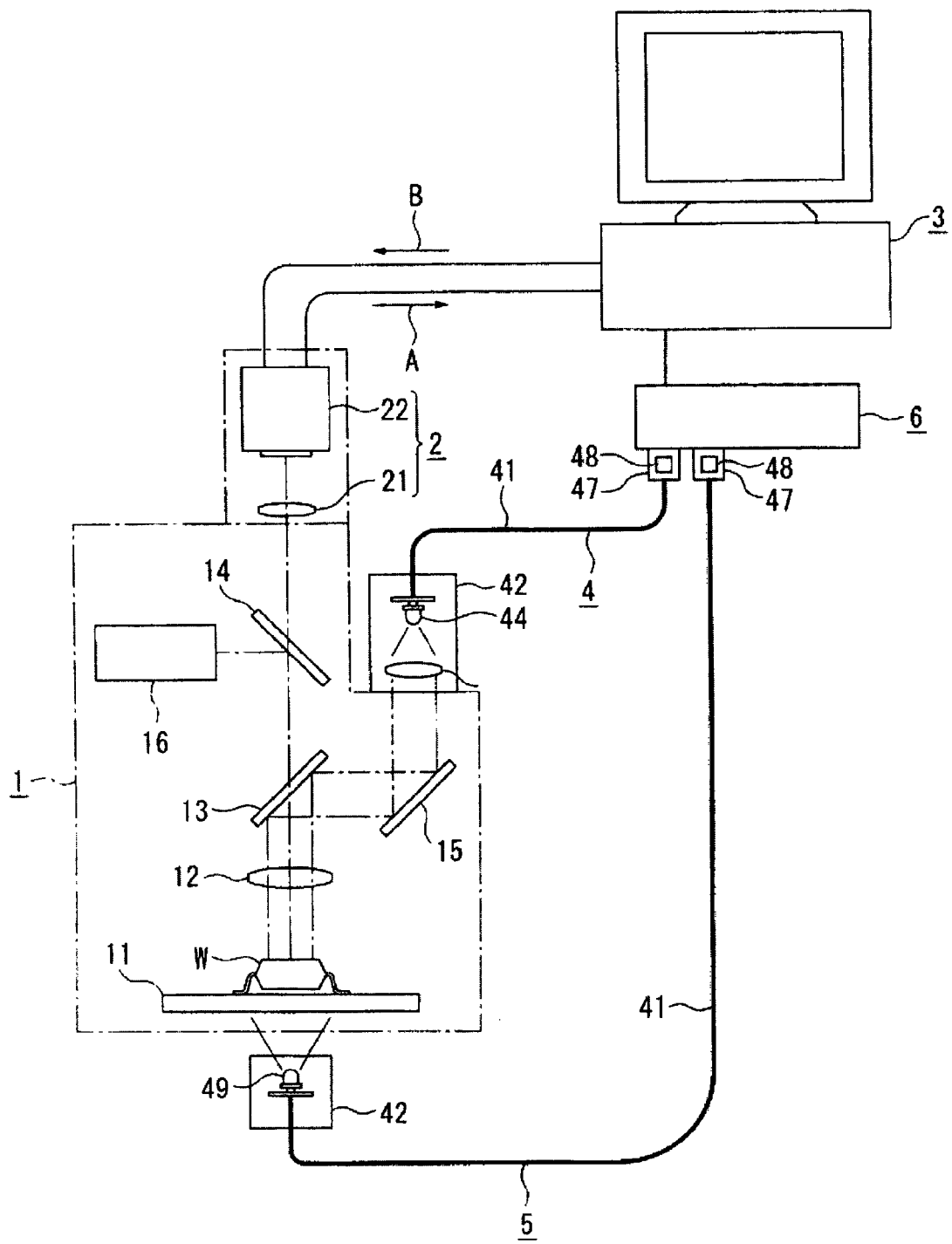
FIG. 1 is a schematic drawing showing an embodiment of an optical measuring apparatus according to the invention.

With reference to the drawings, an optical measuring apparatus according to the present invention may be, for example, a microscope. The illustrated microscope includes a measuring apparatus body 1, a CCD (Charge Coupled Device) camera 2 serving as an image pickup device demountably mounted on the measuring apparatus body 1, a PC (Personal Computer) 3 for measuring the shape or the like of a measured object W by processing image information acquired by the CCD camera 2, an incident-light lighting unit 4 and a transmission lighting unit 5 demountably mounted on the measuring apparatus body 1, and a lighting controller 6 configured to control the incident-light lighting unit 4 and the transmission lighting unit 5.

The measuring apparatus body 1 includes a table 11 formed of a glass plate for placing the measured object W, an objective lens 12 arranged on the table 11 so as to be movable upward and downward, half mirrors 13 and 14 arranged on an optical axis of the objective lens 12, a reflecting mirror 15 configured to allow an incident light to enter the half mirror 13, and an observation optical system 16 including an eyepiece for observing reflected light from the half mirror 14.

The CCD camera 2 includes an image pickup lens 21 configured to image light transmitted through the half mirrors 13 and 14 to a predetermined position, and an image pickup element 22 configured to receive the light imaged by the image pickup lens 21.

The PC 3, including a CPU (Central Processing Unit), memory, and the like is configured to control the entire microscope, and is able to sample the image information of the measured object W picked up by the CCD camera 2 and store the same in the memory as image data (arrow A in FIG. 1), and output control signals for setting gain, exposure time, and the like of the CCD camera 2 (arrow B in FIG. 1).

Figure 2:
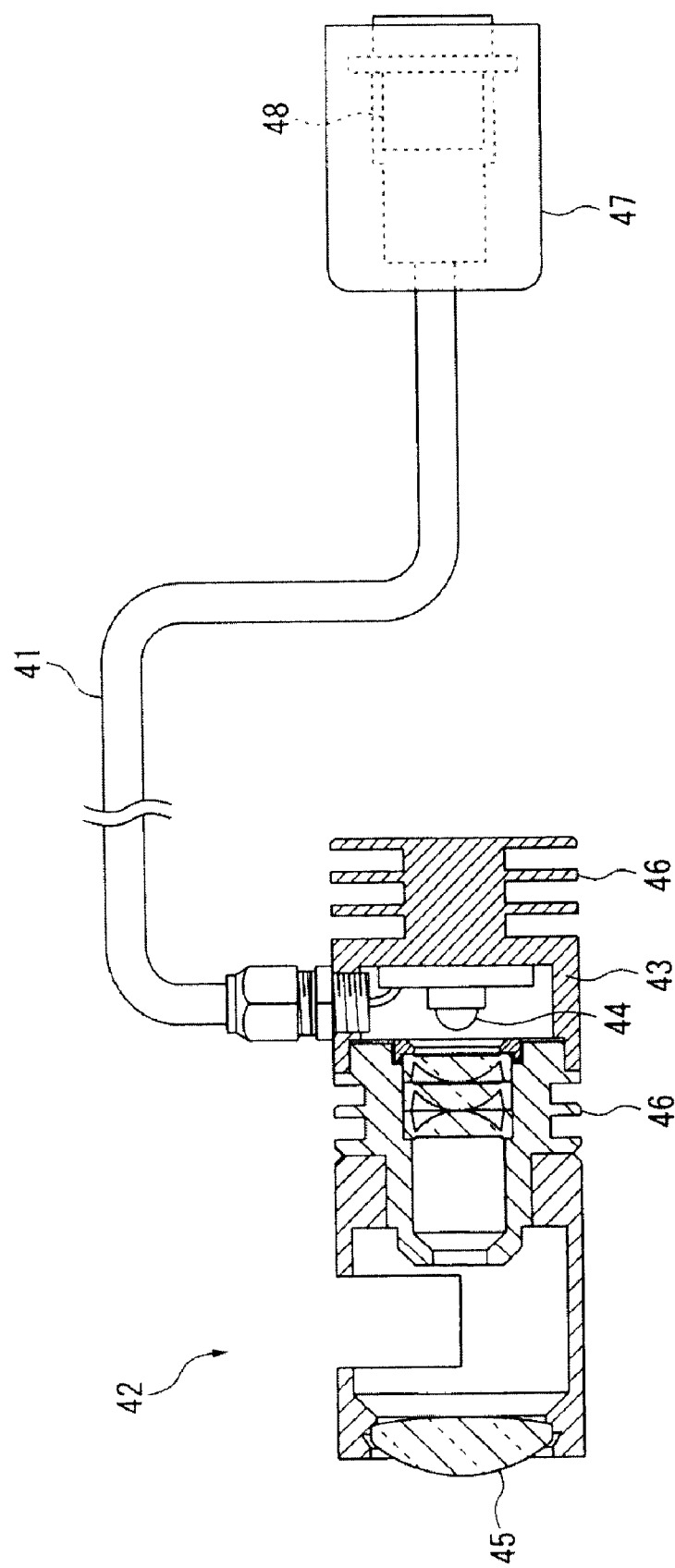
FIG. 2 is a drawing showing a lighting unit in the same embodiment.

The incident-light lighting unit 4 is configured to illuminate the measured object W from above in FIG. 1, and includes a cable 41, a light-emitting unit 42 provided at an end of the cable 41, and a connecting unit 47 provided on the other end of the cable 41 and connected to the lighting controller 6 as shown in FIG. 2.

The light-emitting unit 42 includes a case 43 configured to be demountably or removably mounted on the measuring apparatus body 1, a light-incident LED 44 as a light-emitting diode integrated in the case 43, and a collimator lens 45 configured to collimate light emitted from the light-incident LED 44 and guide the light to enter the reflecting mirror 15. A plurality of heat-discharging fins 46 are provided on an outer peripheral portion of the case 43, which have the light-incident LED 44 integrated therein. The heat-discharging fins 46 serve as a heat discharging device. Accordingly, heat from the light-incident LED 44 is discharged out via the heat-discharging fins 46.

The connecting unit 47 is provided with a storage unit 48. A conversion table including current command values to be applied to the light-incident LED 44 and duty ratios when controlling the pulse of current to be applied to the light-incident LED 44 corresponding to light intensity command value is stored as calibration values in the storage unit 48. More specifically, in the storage unit 48, different duty ratios are stored for low light intensity command values as the calibration values in the low light intensity command values (a range where the light intensity command values are smaller than a predetermined reference light intensity command value L) and different current command values are stored as the calibration values in high light intensity command values (not lower than the predetermined reference light intensity command value L) from among the light intensity command values.

The transmission lighting unit 5 is configured to illuminate the measured object W from below in FIG. 1, and is substantially the same as the incident-light lighting unit as a basic configuration. Therefore, detailed description is replaced by the illustration in FIG. 2. However, in a storage unit 48 of the transmission lighting unit 5, a conversion table including current command values to be applied to a transmission lighting LED 49 and duty ratios when controlling the pulse of current to be applied to the transmission lighting LED 49 corresponding to the light intensity command value is stored as the calibration values.

Figure 3:
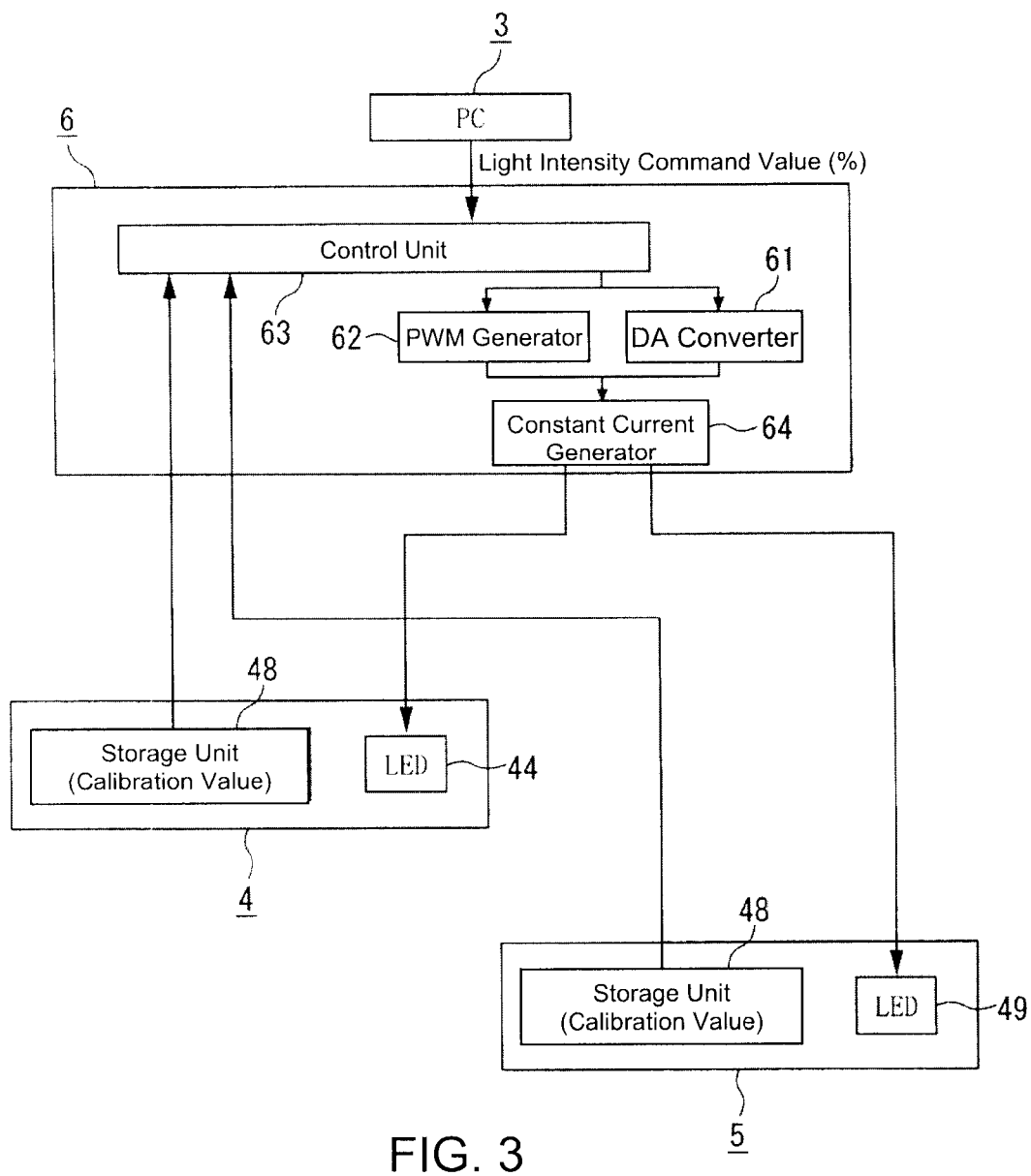
FIG. 3 is a block diagram showing a lighting controller in the same embodiment.

As shown in FIG. 3, the lighting controller 6 includes a DA converter 61, a PWM generator 62, a control unit 63, and a constant current generator 64. The control unit 63 is configured to read output current command values and duty ratios corresponding to the light intensity command value out from the storage units 48 of the incident-light lighting unit 4 and the transmission lighting unit 5 upon receipt of the light intensity command value from the PC 3 and set the current command values and the duty ratios read out therefrom to the DA converter 61 and the PWM generator 62. The constant current generator 64 is configured to apply currents corresponding to the current command values converted by the DA converter 61 when the control pulse from the PWM generator 62 is turned ON to the LEDs 44 and 49 of the lighting unit.

During measurement of the measured object W when the incident-light lighting unit 4 is used, the light emitted from the light-incident LED 44 is reflected from the reflecting mirror 15 via the collimator lens 45, and is emitted from above the measured object W via the objective lens 12. The reflected light from the measured object W passes through the objective lens 12, the half mirrors 13 and 14 and enters the CCD camera 2, and part of the reflected light reflected from the half mirror 14 enters the observation optical system 16 and is observed by the observation optical system 16.

On the other hand, when the transmission lighting unit 5 is used, the measured object W is irradiated with the light emitted from the transmission lighting LED 49 from below. The light passed through the measured object W passes through the objective lens 12, the half mirrors 13 and 14 and enters the CCD camera 2, and part of the light reflected from the half mirror 14 enters the observation optical system 16 and is observed by the observation optical system 16.

Then, the PC 3 samples the image information of the measured object W picked up by the CCD camera 2 and taken into the memory as the image data, and processes the taken image data to measure the shape of the measured object W.

Figure 4A:
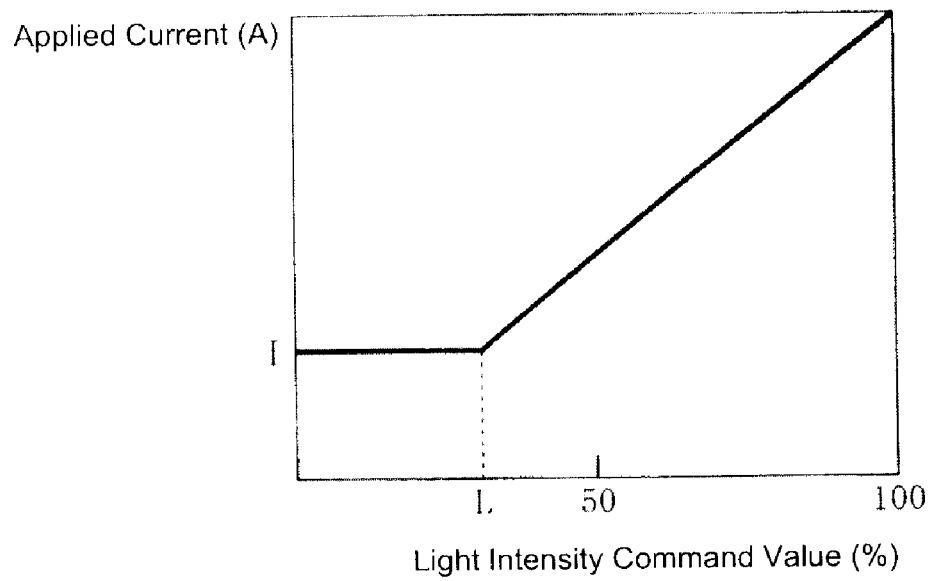
FIG. 4 is a graph showing a control state with respect to a high light intensity command value and a low light intensity command value in the same embodiment.
Figure 4B:
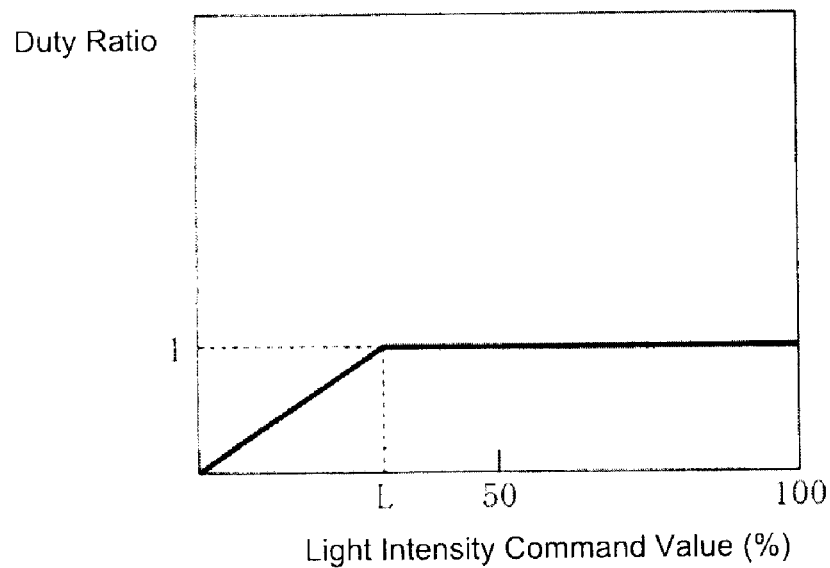

FIGS. 4A and 4B are graphs showing a control state by the current command values and the duty ratios stored in the storage units 48 of the incident-light lighting unit 4 and the transmission lighting unit 5. In FIG. 4A, a horizontal axis indicates the light intensity command value, and a vertical axis indicates the applied current. In FIG. 4B, the horizontal axis indicates the light intensity command value, and the vertical axis indicates the duty ratio of the pulse.

Figure 5:
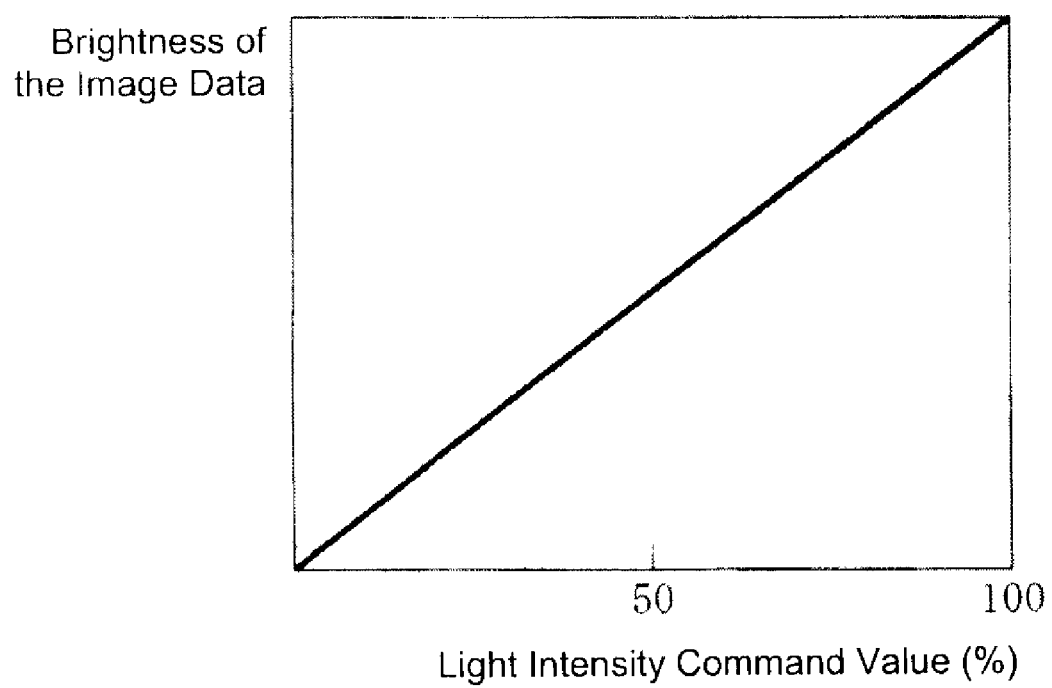
FIG. 5 is a graph showing a relationship showing the light intensity command value and the brightness of image data picked up by a CCD camera in the same embodiment.

FIG. 5 is a graph showing a relationship between the light intensity command value and the brightness of the image data picked up by the CCD camera 2. In FIG. 5, the horizontal axis indicates the light intensity command value and the vertical axis indicates the brightness of the image data.

The control unit 63 controls the light intensities of the light-incident LED 44 and the transmission lighting LED 49 on the basis of the calibration values read out from the storage units 48.

First of all, when the light intensity command values read from the storage units 48 are the low light intensity command values, pulses of currents to be applied to the light-incident LED 44 and the transmission lighting LED 49 are controlled. Specifically, in the case of the low light intensity command value (when the light intensity command value is smaller than the reference light intensity command value L), no-current state is designated as Low, and a current having a reference value I from which the reference light intensity command value L can be obtained is designated as High as shown in FIG. 4A, and the light intensity in the low light intensity command value range is controlled by controlling the duty ratio of the pulse, as shown in FIG. 4B.

Also, when the light intensity command values read from the storage units 48 are the high light intensity command values, currents to be applied to the light-incident LED 44 and the transmission lighting LED 49 are controlled. Specifically, in the case of the high light intensity command value (when the light intensity command value is not smaller than the reference light intensity command value L), the pulse control is stopped (duty ratio 100%) as shown in FIG. 4B and the light intensity in the high light intensity command value range is controlled by controlling applied current, as shown in FIG. 4A.

Therefore, the brightness of the image data picked up by the CCD camera 2 has a substantially linear relationship as shown in FIG. 5.

The brightness of the image data picked up by the CCD camera 2 is not limited to a linear relationship as shown in FIG. 5, but may be various curves by changing the calibration values. In general, since human eyes are sensitive to changes in a dark area, a curved line like a quadratic function which assumes smaller change when it is dark may also be employed.

(1) Since the storage units 48 in which the calibration values for causing the light-incident LED 44 and the transmission lighting LED 49 to generate the light intensities corresponding to the light intensity command value are provided on the incident-light lighting unit 4 and the transmission lighting unit 5 demountably mounted on the measuring apparatus body 1, an operation to write the calibration values when replacing the incident-light lighting unit 4 and the transmission lighting unit 5 can be eliminated. Therefore, since a serviceman does not have to go to a user's site to perform a setting operation, the cost for the replacement of the incident-light lighting unit 4 and the transmission lighting unit 5 is reduced.

(2) Since the light calibration can be performed any time after the incident-light lighting unit 4 and the transmission lighting unit 5 are assembled, improvement of the production efficiency is achieved. In other words, disadvantages such as an increase in the number of components in the midcourse of assembly and lowering of the manufacturing space efficiency are eliminated.

Simultaneously, the risk of connecting the wrong lighting unit and using the apparatus with a wrong light intensity caused by connecting a wrong measuring unit is eliminated.

(3) Since the current command values to be applied to the LEDs 44 and 49 and the duty ratios when controlling the pulses of the currents to be applied to the LEDs 44 and 49 corresponding to the light intensity command value are stored as the calibration values, the light intensities of the LEDs 44 and 49 are accurately controlled using the two calibration values; the current command value and the duty ratio.

In particular, since the different duty ratios are stored for the low light intensity command values as the calibration values in the low light intensity command values and the different current command values are stored as the calibration values in the high light intensity command values from among the light intensity command values, the light intensities of the LEDs 44 and 49 can be accurately controlled by the control of the pulse width in the low light intensity command values, and the light intensities in the high light intensity range can be accurately controlled as in the related art by controlling the currents to be applied to the LEDs 44 and 49 in the high light intensity command values. Therefore, in the entire range of the light intensity command value, the light intensities of the LEDs 44 and 49 can be accurately controlled.

(4) The incident-light lighting unit 4 and the transmission lighting unit 5 each include the cable 41, the light-emitting unit 42, and the connecting unit 47, and the connecting unit 47 is provided with the storage unit 48. Since the storage unit is provided in the connecting unit 47 apart from the light-emitting unit 42 as the light source, the storage unit 48 is prevented from being affected by the heat from the light-emitting unit 42 as much as possible.

The invention is not limited to the embodiment described above, and modifications or improvements within the range that allows achievement of the invention are included in the invention.

Figure 6:
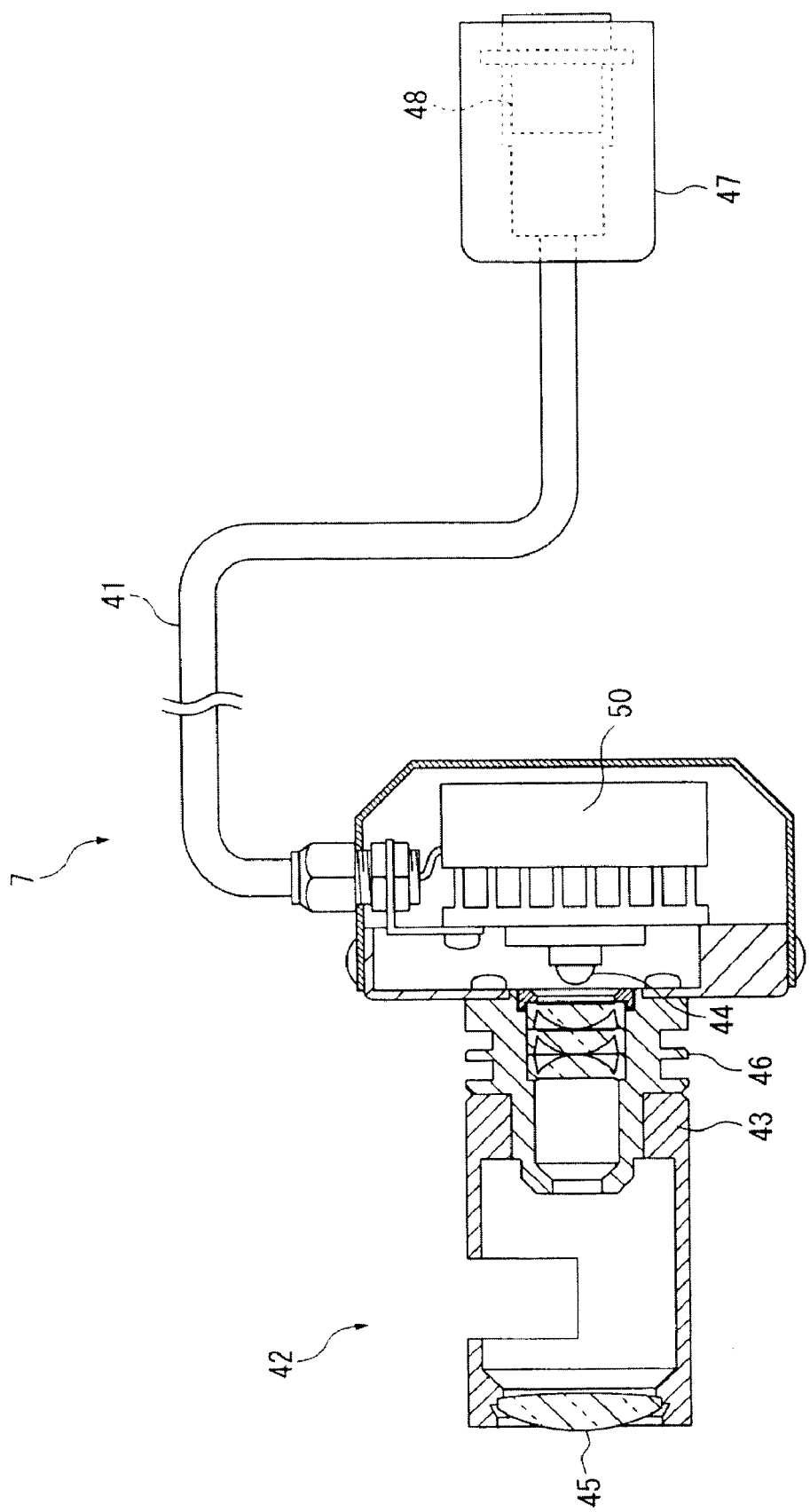
FIG. 6 is a drawing showing another example of the lighting unit.
Figure 7:
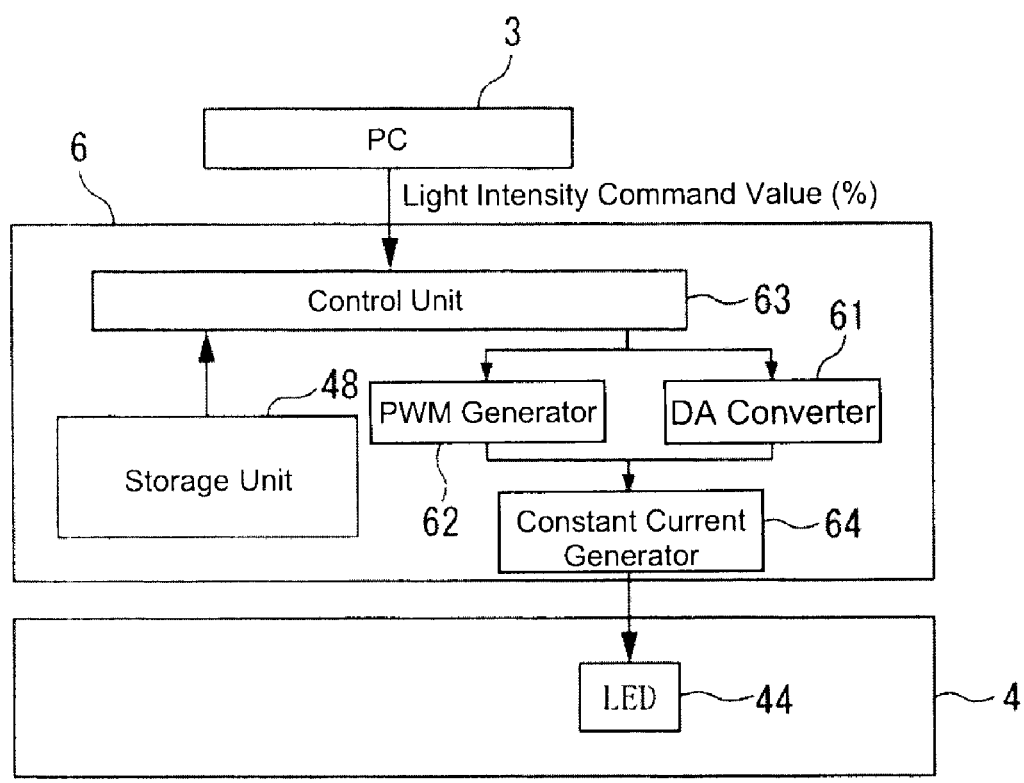
FIG. 7 is a drawing showing a relationship between a lighting controller and a lighting unit in the related art.

The incident-light lighting unit 4 and the transmission lighting unit 5 are not limited to the structure described in the embodiment. For example, a structure shown in FIG. 6 is also applicable. A lighting unit 7 shown in FIG. 6 includes a heat-discharging fan 50 as the heat discharging device integrated in the light-emitting unit 42. The heat-discharging fan 50 is configured to be operated by the lighting controller 6 when the connecting unit 47 is connected to the lighting controller 6.

Therefore, according to the configuration as described above, since the heat-discharging fan 50 is provided in the light-emitting unit 42, and the heat-discharging fan 50 is operated by the lighting controller 6 when the connecting unit 47 is connected to the lighting controller 6, the adverse effects of heat from the light-emitting unit 42 are avoided as much as possible.

In particular, in this structure, since the heat from the light-emitting unit 42 can be discharged efficiently to the outside, it is suitable for measuring apparatuses which require a lighting unit having a high light intensity.

Also, although the light intensity in the low light intensity range is controlled by controlling the duty ratio of the pulse corresponding to the low light intensity command value in the embodiment described above, the invention is not limited thereto. For example, the light intensity in the low light intensity command value range can be controlled by controlling the High current value of the pulse.

Also, the light intensity in the low light intensity range may be controlled by controlling the exposure time of the CCD camera 2 corresponding to the low light intensity command value. Alternatively, the light intensity in the low light intensity range may be controlled by controlling the gain of the image pickup device, and the light intensity in the low light intensity range may be controlled by controlling the gain and the exposure time of the image pickup device.

Although the lighting units 4 and 5 using a single color LEDs 44 and 49 have been described in the embodiment described above, the invention is also applicable to an optical measuring apparatus configured to produce light in a desired color by combining LEDs of R (red), G (green), and B (blue), for example, and irradiate the measured object W with the produced light to measure the measured object W.

Although the light intensity command value is given by the PC 3 in the embodiment described above, for example, a configuration in which the light intensity command value is set in the measuring apparatus body 1 and provided from the measuring apparatus body 1 to the lighting controller 6 is also applicable.

Although the control unit 63 reads the calibration values corresponding to the light intensity command value from the storage units 48 upon receipt of the light intensity command value from the PC 3, and controls the LEDs 44 and 49 on the basis of the calibration values in the embodiment described above, the invention is not limited thereto. For example, when EEPROM (Electrically Erasable and Programmable Read Only Memory) is used as the storage units 48, the cost is reduced. However, since the access speed of the EEPROM is low, the response of light modulation becomes slow. Therefore, by configuring the control unit 63 to have a CPU or a RAM (Random Access Memory) thereby reading the calibration values out from the storage units 48 when activating the CPU and storing the same in the RAM, and controlling the LEDs 44 and 49 by reading the calibration values corresponding to the light intensity command value out from the RAM, the response of the light modulation is improved.

The present invention is applicable to a microscope, an image measuring apparatus, and so on provided with a lighting unit having a light-emitting diode as a light source.

What is claimed is:

1. An optical measuring apparatus comprising:
   a measuring apparatus body;
   a lighting unit demountably mounted on the measuring apparatus and having a light-emitting diode as a light source; and
   a lighting controller configured to control the lighting unit according to a light intensity command value, wherein the lighting unit includes a storage unit in which calibration values for causing the light-emitting diode to generate light intensity corresponding to the light intensity command value are stored, wherein the lighting unit is releasably connected to the lighting controller, and the lighting controller receives the light intensity command value and reads out a calibration value corresponding to the light intensity command value from the calibration values stored in the storage unit, controls the light-emitting diode based upon the calibration value, and causes the light-emitting diode to generate light intensity corresponding to the light intensity command value, wherein the lighting unit includes a cable, a light-emitting unit being provided at an end of the cable and having the light-emitting diode, and a connecting unit being provided at the other end of the cable and being connected to the lighting controller, and the storage unit is provided in the connecting unit, wherein the light-emitting unit includes a heat-discharging fan, and operation of the heat-discharging fan is controlled by the lighting controller when the connecting unit is connected to the lighting controller.

2. The optical measuring apparatus according to claim 1, wherein a conversion table including current command values to be applied to the light-emitting diode and duty ratios when controlling a pulse of current to be applied to the light-emitting diode corresponding to light intensity command value, are stored as the calibration values in the storage unit, and the lighting controller reads out a current command value and a duty ratio corresponding to the light intensity command value from the conversion table upon receipt of the light intensity command value, and applies a current corresponding to the current command value to the light-emitting diode in the lighting unit when a control pulse of the read out duty ratio is ON.

3. The optical measuring apparatus according to claim 2, wherein in the storage unit, different duty ratios are stored for low light intensity command values as the calibration values in the low light intensity command values and different current command values are stored as the calibration values in a high light intensity command values from among the light intensity command values.

4. The optical measuring apparatus according to claim 1, wherein in the storage unit, different duty ratios are stored for low light intensity command values as the calibration values in the low light intensity command values and different current command values are stored as the calibration values in a high light intensity command values from among the light intensity command values.

* * * * *